United States Patent
Wang et al.

(10) Patent No.: US 9,154,795 B2
(45) Date of Patent: Oct. 6, 2015

(54) METHOD AND APPARATUS FOR ESTIMATING CHANNEL INDUCED DISTORTION

(75) Inventors: Yao Wang, Old Bridge, NJ (US); Boyce Jill MacDonald, Manalapan, NJ (US); Zhenyu Wu, Plainsboro, NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 2574 days.

(21) Appl. No.: 11/795,089

(22) PCT Filed: Jan. 17, 2006

(86) PCT No.: PCT/US2006/001475
§ 371 (c)(1),
(2), (4) Date: Jul. 10, 2007

(87) PCT Pub. No.: WO2006/078595
PCT Pub. Date: Jul. 27, 2006

(65) Prior Publication Data
US 2008/0089414 A1    Apr. 17, 2008

Related U.S. Application Data

(60) Provisional application No. 60/644,787, filed on Jan. 18, 2005.

(51) Int. Cl.
*H04N 19/109* (2014.01)
*H04N 21/442* (2011.01)
(Continued)

(52) U.S. Cl.
CPC .......... *H04N 19/109* (2014.11); *H04N 19/166* (2014.11); *H04N 19/177* (2014.11); *H04N 21/44209* (2013.01)

(58) Field of Classification Search
CPC ... H04N 19/59; H04N 19/107; H04N 19/109; H04N 19/166; H04N 19/177; H04N 19/154; H04N 19/567
USPC .......... 375/240.01–240.03, 240.16, 375/240.26–240.27, 130–153
See application file for complete search history.

(56) References Cited

U.S. PATENT DOCUMENTS 6,122,015 A * 9/2000 Al-Dhahir et al. ............ 348/614
6,591,396 B1 7/2003 Honda
(Continued)

FOREIGN PATENT DOCUMENTS

JP  2000-341688  12/2000
WO  WO03041055   5/2003

OTHER PUBLICATIONS

Zhihai He et al., Joint Source Channel Rate-Distortion Analysis for Adaptive Mode Selection and Rate Control in Wireless Video Coding, Jun 2002, IEEE, vol. 12, Issue 6, pp. 511-523.*

(Continued)

*Primary Examiner* — Bradley Holder
*Assistant Examiner* — Fahimeh Mohammadi
(74) *Attorney, Agent, or Firm* — Robert D. Shedd; Chris Kolefas

(57) ABSTRACT

There are provided methods and apparatus for estimating channel induced distortion. A method for estimating distortion for an inter-coded image includes the step of calculating an average channel distortion for received inter-coded macroblocks in the inter-coded image as a previous average channel distortion multiplied by a scaling factor.

12 Claims, 5 Drawing Sheets

(51) Int. Cl.
*H04N 19/166* (2014.01)
*H04N 19/177* (2014.01)

(56) References Cited

U.S. PATENT DOCUMENTS

| | | | | |
|---|---|---|---|---|
| 7,106,907 | B2 * | 9/2006 | Lin et al. | 382/236 |
| 7,653,132 | B2 * | 1/2010 | Dang | 375/240.12 |
| 2002/0133764 | A1 * | 9/2002 | Wang | 714/707 |
| 2003/0016753 | A1 * | 1/2003 | Kim et al. | 375/240.21 |
| 2003/0031128 | A1 * | 2/2003 | Kim et al. | 370/229 |
| 2003/0048856 | A1 * | 3/2003 | Ketchum et al. | 375/260 |
| 2003/0099298 | A1 | 5/2003 | Rose et al. | |
| 2004/0114684 | A1 * | 6/2004 | Karczewicz et al. | 375/240.03 |
| 2004/0218673 | A1 * | 11/2004 | Wang et al. | 375/240.12 |
| 2005/0175099 | A1 * | 8/2005 | Sarkijarvi et al. | 375/240.16 |
| 2006/0013320 | A1 * | 1/2006 | Oguz et al. | 375/240.27 |
| 2006/0104366 | A1 * | 5/2006 | Huang et al. | 375/240.27 |
| 2010/0104025 | A1 * | 4/2010 | Rose et al. | 375/240.27 |
| 2010/0169101 | A1 * | 7/2010 | Ashley et al. | 704/500 |

OTHER PUBLICATIONS

Yao Wang et al, Error Control and Concealment for Video Communication: A Review, Aug. 6, 2002, IEEE, vol. 86, Issue 5, pp. 974-997.*

Jacob Chakareski et al., Rate-Distortion Hint Tracks for Adaptive Video Streaming, Sep. 26, 2005, IEEE, vol. 15, Issue 10, pp. 1257-1269.*

Rui Zhang et al., Video Coding with Optimal Inter/Intra-Mode Switching for Packet Loss Resilience, Jun. 2000, IEEE, vol. 18, Issue 6, pp. 966-976.*

Cote et al., "Optimal Mode Selection and Synchronization for Robust Video Communications Over Error-Prone Networks", IEEE Journal on Selected Areas in Communications, vol. 18, No. 6, Jun. 2000.

He et al., "Joint Source Channel Rate-Distortion Analysis for Adaptive Mode Selection and Rate Control in Wireless Video Coding," XP-001114979, IEEE Transactions on Circuits and Systems for Video Technology, vol. 12, No. 6, Jun. 2002.

Stuhlmuller et al., "Analysis of Video Transmission Over Lossy Channels," IEEE Journal on Selected Areas in Communications, vol. 18, No. 6, Jun. 2000.

Wiegand et al., "Overview of the H.264/AVC Video Coding Standard," Xp-001169882, IEEE Transactions on Circuits and Systems for Video Technology, vol. 13, No. 7, Jul. 2003.

Xiong et al., "An Error Resilience Scheme on an End-to-End Distortion Analysis for Video Transmission Over Internet," 2004 IEEE.

Zhang et al., "Error Resilience Video Coding in H.264 Encoder with Potential Distortion Tracking," 2004 International Conference on Image Processing (ICIP).

Zhang et al., "Optimum End-to-End Distortion Estimation for Error Resilient Video Coding," XP-002381771, Beijing Broadcasting Institute, Beijing, China.

Zhang et al., "Video Coding with Optimal Inter/Intra-Mode Switching for Packet Loss Resilience," IEEE Journal on Selected Areas in Communications, vol. 18, No. 6, Jun. 2000.

* cited by examiner

METHOD AND APPARATUS FOR ESTIMATING CHANNEL INDUCED DISTORTION

CROSS-REFERENCE TO RELATED APPLICATIONS

This application is a National Stage Application and claims the benefit, under 35 U.S.C. §365 of International Application PCT/US2006/01475 filed Jan. 17, 2006, which was published in accordance with PCT Article 21(2) on Jul. 27, 2006 in English, and which claims the benefit of U.S. provisional patent application No. 60/644,787 filed on Jan. 18, 2005.

FIELD OF THE INVENTION

The present invention relates generally to data communication and, more particularly, to a method and apparatus for estimating channel induced distortion.

BACKGROUND OF THE INVENTION

The video received by a user in a networked video application (e.g., video streaming or video telephony) differs from the original video. The difference, or the distortion, is incurred, for example, by quantization applied at the video encoder, and bit errors and packet losses during the transmission. The latter, referred to as "channel-induced distortion" (or "channel distortion" for short) depends on many factors including, for example, characteristics of channel errors, error resilience features applied at the encoder, error concealment techniques employed at the decoder, and the motion and texture content of the underlying sequence. Accurate estimation of the channel-induced distortion enables a video service provider to optimally select operating parameters of the source encoder, the channel encoder, and other transport error control mechanisms, to maximize the received video quality for a given channel bandwidth.

In the prior art, an analytical model was developed which relates the average channel-induced distortion with the packet loss rate and the intra-rate, by modeling the spatial-temporal error propagation behavior as a leaking filter. However, the attachment of physical meanings to the model parameters is not without difficulty.

Also in the prior art, the so-called ROPE (Recursive Optimal Per Pixel Estimate) method is known, which recursively calculates the expected difference between the original and decoded value at each pixel. The ROPE method can be used to calculate the expected distortion for a new macroblock using different coding modes (inter vs. intra) so that the encoder can choose the mode that leads to the minimal distortion. However, the ROPE method is not applicable for determining the average intra-rate before actual encoding for a given channel loss rate. Moreover, the ROPE method is also computationally intensive. Also, the ROPE method is only applicable when the encoder employs only integer motion vectors for temporal prediction, and when the decoder uses a simple error concealment method that copies the co-located blocks in the previously reconstructed frame for any lost block in the current frame.

Further in the prior art, a frame-level recursion formula (hereinafter the "conventional frame-level recursion formula") was developed, which relates the channel-induced distortion in a current frame with that in a previous frame. However, this model is only applicable for the simple error concealment method that copies the co-located blocks in the previously reconstructed frame for any lost block in the current frame.

All of the prior art described above considers error propagation due to only temporal inter-prediction. Further, most prior art methods do not take into account non-integer motion compensation for temporal prediction and concealment, nor do they consider the effect of deblocking filtering.

Spatial intra-prediction and deblocking filtering are two new features, of the latest H.264 video coding standard and significantly improve the coding efficiency over previous standards.

Accordingly, it would be desirable and highly advantageous to have a method and apparatus for estimating channel induced distortion that overcome the above-described limitations of the prior art.

SUMMARY OF THE INVENTION

These and other drawbacks and disadvantages of the prior art are addressed by the present invention, which is directed to methods and apparatus for estimating channel induced distortion.

According to an aspect of the present invention, there is provided a method for estimating distortion for an inter-coded image. The method includes the step of calculating an average channel distortion for received inter-coded macroblocks as a previous average channel distortion multiplied by a scaling factor.

According to another aspect of the present invention, there is provided a method for estimating distortion for a P-frame. The method includes the step of computing an average channel distortion for received, intra-coded macroblocks in the P-frame as a previous frame average channel distortion multiplied by a scaling factor, when the intra-coded macroblocks are encoded using non-constrained intra prediction.

According to yet another aspect of the present invention, there is provided a method for estimating distortion for a current video image. The method includes the step of calculating an average channel distortion, for macroblocks of the current video image that are lost and concealed using a motion-compensated temporal error concealment method, as a sum of an average concealment distortion and a propagated distortion from a previous video image. The propagated distortion is calculated as an average channel distortion in the previous video image multiplied by a scaling factor.

According to an additional aspect of the present invention, there is provided a method for determining an average concealment distortion for a inter-coded image. The method includes the step of defining a concealment distortion for a given macroblock in the inter-coded image as a channel distortion for the given macroblock when there is an absence of transmission losses in other frames and other macroblocks in the inter-coded image. The method also includes the step of estimating the concealment distortion for a selected macroblock in the inter-coded image by setting the selected macroblock as lost and concealing the selected macroblock using a decoder error concealment method. The method further includes the step of repeating the estimating step for other selected macroblocks in the inter-coded image. Moreover, the method includes the step of calculating the average concealment distortion for the macroblocks in the inter-coded image based upon the estimated concealment distortions for the selected macroblocks in the inter-coded image.

According to a yet additional aspect of the present invention, there is provided a method for determining an average concealment distortion of a group of pictures (GOP). The method includes the step of estimating a concealment distortion for a selected macroblock in a selected inter-coded image in the GOP by setting the selected macroblock as lost and concealing the selected macroblock using a decoder error concealment method. The method also includes the step of repeating the estimating step for other selected macroblocks in the selected inter-coded image and other selected inter-coded images in the GOP. The method further includes the step of calculating the average concealment distortion of the GOP based upon the estimated concealment distortions for the selected macroblocks in the selected inter-coded images in the GOP.

According to a further aspect of the present invention, there is provided a method for determining an average concealment distortion for a picture sequence. The method includes the step of estimating a concealment distortion for a selected macroblock in a selected inter-coded image in the picture sequence by setting the selected macroblock as lost and concealing the selected macroblock using a decoder error concealment method. The method also includes the step of repeating the estimating step for other selected macroblocks in the selected inter-coded image and other selected inter-coded images in the picture sequence. The method further includes the step of calculating the average concealment distortion for the inter-coded images in the picture sequence based upon the estimated concealment distortions for the selected macroblocks in the selected inter-coded images in the picture sequence.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
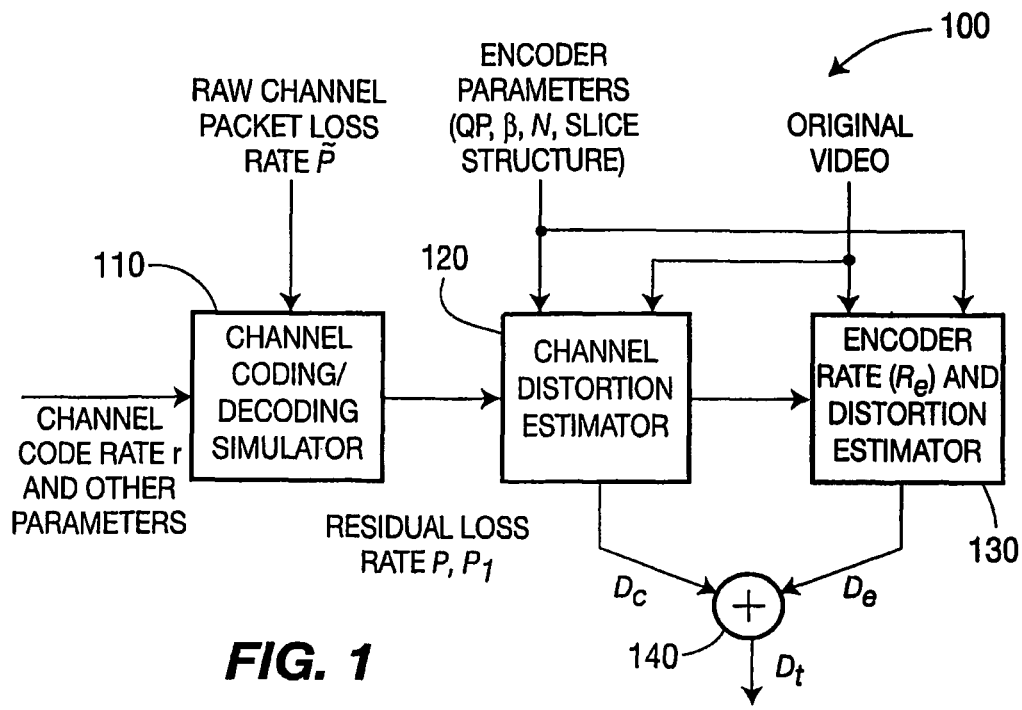
FIG. 1 shows a block diagram of an apparatus for determining the total expected distortion at the video decoder in accordance with the principles of the present invention.

The present invention is directed to methods and apparatus for estimating channel-induced distortion. Advantageously, the present invention may be configured to take into account the use of inter- and intra-prediction and the use of deblocking filtering. Moreover, the present invention may be configured to consider the impact of encoder motion compensation and motion-compensated temporal concealment using non-integer motion vectors.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual, only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

In accordance with the principles of the present invention, an apparatus and method are disclosed for estimating the distortion caused by packet losses. More specifically, using mathematical analysis, new mathematical recursion formulae have been derived that relate the channel-induced distortion with the packet loss rate, the encoder intra rate (frequency of intra-coded blocks and frames), for any fixed error concealment technique. Each formula is for one type of encoder and decoder configuration. Based on the recursion equations for different video encoder/decoder configurations, practical methods are provided herein for estimating the channel-induced distortion. In accordance with the principles of the present invention, methods have also been developed for estimating the parameters in the recursion equations based on training sequences, and for estimating the concealment distortion for a given video sequence, which is the average per pixel channel distortion for a lost coded slice, while assuming the other slices are all received. The estimated concealment distortion and model parameters are used in channel distortion estimation for a given video sequence.

One possible application of an embodiment of the present invention is in designing and operating a video streaming server. The server includes a video encoder and a channel encoder that applies cross-packet channel coding to the encoded bit stream. The video encoder can vary the quantization parameter (QP), the intra rate $\beta$ (the frequency by which a macroblock (MB) in P-frames is coded in the intra-mode), the interval between periodic I-frames, N, and the slice structure. The latter (i.e., slice structure) refers to the pattern by which data for one video frame is divided into possibly more than one coded slice. For example, all of the data for one frame can be placed into one slice, or alternating MBs or alternating rows of a frame can be placed into two separate slices. The channel coder can vary the channel coding rate r. Suppose that the total bandwidth allocated for streaming one video file, denoted by $R_t$, is provided, where the average channel packet loss rate is denoted by $\tilde{P}$. The design problem is to determine the optimal operating parameters in terms of QP, $\beta$, N, the slice structure, and r, so that the received video distortion is minimized under the constraint that the total transmitted bit rate $R_e/r <= R_t$. This problem can be solved using a channel-distortion estimator, together with an encoder distortion-rate estimator and a channel coding/decoding simulator, in accordance with the principles of the present invention.

Turning to FIG. 1, an apparatus for determining optimal operation parameters for minimizing the received video distortion is indicated generally by the reference numeral 100. The apparatus 100 includes a channel coding/decoding simulator 110, a channel distortion estimator 120, and an encoder rate and distortion estimator 130. A first output of the channel coding/decoding simulator 110, which are the residual packet loss rate for the P-frames P and for I-frames $P_I$, is connected in signal communication with a first input of the channel distortion estimator 120. A first output of the channel distortion estimator 120, which is the estimated average channel distortion $D_c$, and a first output of the encoder rate and distortion estimator 130, which is the estimated encoder distortion $D_e$, are respectively connected in signal communication with first and second inputs of an adder 140 (or other blending and/or combining device). The channel coding/decoding simulator 110 also includes a first input for receiving channel code rate r and other parameters, and a second input for receiving the raw channel packet loss rate $\tilde{P}$. The channel distortion estimator 120 and the encoder rate and distortion estimator 130 each respectively include a second input for receiving encoder parameters (QP, $\beta$, N, and slice structure), and also each respectively include a third input for receiving the original video. The adder 140 further includes a first output for outputting $D_t$ described herein below.

For each possible channel code rate r, using the channel coding/decoding simulator 110, the residual packet loss rate P(r) can be determined. For each possible set of QP, $\beta$, N, and slice structure, using the encoder rate and distortion estimator 130, the encoder-induced distortion $D_e$ and the corresponding source rate $R_e$ can be estimated. This will yield all feasible sets of r, QP, $\beta$ and slice structure that satisfies $R_e/r <= R_t$. For each feasible set of r, QP, $\beta$, N, and slice structure and the corresponding residual loss rate P, using the novel channel distortion estimator 120, the average channel-induced distortion over each group of N frames, $D_c$, and consequently the total distortion $D_t = D_e + D_c$ can be calculated. By comparing $D_t$ obtained with different feasible parameter sets, the optimal parameters can be found that will lead to the minimal $D_t$ over each Group of Frames (GoF).

A description will now be given regarding notation and presumptions employed herein.

Let $f_n^i$ denote the original pixel value in frame n and pixel i, $\hat{f}_n^i$ the reconstructed signal at the encoder, and $\tilde{f}_n^i$ the reconstructed signal at the decoder. The difference $e_n^i = \hat{f}_n^i - \tilde{f}_n^i$ is the channel-induced error. The average channel-induced distortion for frame n is defined as the mean square error (MSE) between $\hat{f}_n^i$ and $\tilde{f}_n^i$, i.e.:

$$D_{c,n} = E\left\{\left(\hat{f}_n^i - \tilde{f}_n^i\right)^2\right\} = E\left\{(e_n^i)^2\right\} \quad (1)$$

Here, the operator E{ } represents the average value over all pixel positions in a frame.

It is presumed that the macroblocks (MBs) in a frame are grouped into slices so that there is no dependence between coded data in separate slices, and each slice has its own header, and is carried in a separate packet. It is further presumed that the loss of any bits in a packet will make the corresponding video slice undecodable. It is also presumed that with proper packet interleaving, the packet (and hence slice) loss event can be characterized as an i.i.d. random process by a loss rate P. Moreover, it is presumed that each slice includes the same number of macroblocks, so that the macroblock loss rate is equal to the slice loss rate.

One concern addressed by the present invention is the progression of the channel distortion in successive P-frames, within each a macroblock may be coded in either inter- or intra-mode. The intra-mode is used either because it takes fewer bits, or for error-resilience purposes. The percentage of macroblocks that are coded in the intra-mode in frame n is denoted by $\beta_n$.

It is presumed that if a macroblock is lost in frame n, the macroblock will be concealed using motion-compensated temporal concealment, with an average distortion $D_{L,n}$. If a macroblock is received, depending on its coding mode, it could still have channel distortion due to errors in previous frames or pixels, and the corresponding distortion is denoted by $D_{IR,n}$ and $D_{PR,n}$, respectively. The average channel distortion for frame n is:

$$D_{c,n} = (1-P)(\beta_n D_{IR,n} + (1-\beta_n) D_{PR,n}) + P D_{L,n} \quad (2)$$

The present invention estimates $D_{c,n}$ based on a recursion formula that relates $D_{c,n}$ with $D_{c,n-1}$ for P-frames. Hereinafter, the recursion formulae derived for video encoders and decoders employing different options will be described, followed by a description of how to perform estimation based on the derived recursion models and how to estimate the model parameters.

A description will now be given regarding a first illustrative case to which the principles of the present invention may be applied. The first case involves using inter-prediction and temporal concealment with non-integer motion vectors, without intra-prediction and deblocking filtering.

In this first case, for a received intra-mode MB (I-MB), there will be no channel distortion, i.e., $D_{IR,n}=0$. For an inter-mode MB (P-MB), even if it is received, its reconstruction may have channel distortion due to errors in the previous frame. To take into account the interpolation operation typically applied when doing motion compensation using non-integer motion vectors, it is presumed that pixel $f_n^i$ is predicted by a weighted sum of several neighboring pixels in frame n−1, denoted by:

$$f_{p,p,e}^i = \sum_{l=i}^{L_{p,p}} a_l \hat{f}_{n-1}^{j_1(i)} \qquad (3)$$

where $j_l(i)$ refers to the spatial index of the l-th pixel in frame n−1 that was used to predict $f_n^i$. Note that this formulation is also applicable to overlapped block motion compensation (OBMC) employed in the H.263 codec. The interpolation coefficients $a_l$ satisfy $$\sum_l a_l = 1.$$

The values for $L_{p,p}$ and $a_l$ depend on the motion vector (MV) for the MB, and the interpolation filter employed for fractional-pel motion compensation. For example, with a bilinear interpolation filter, if the MV is half-pel in both horizontal and vertical direction, then $L_{p,p}=4$, $a_l=¼$. On the other hand, if the MV is half-pel in one direction but integer in another direction, then $L_{p,p}=2$, $a_l=½$. Moreover, if the MV is integer in both directions, then $L_{p,p}=1$, $a_l=1$.

In the receiver, the prediction is based on the following:

$$f_{p,p,d}^i = \sum_{l=1}^{L_{p,p}} a_l \tilde{f}_{n-1}^{j_l(i)} \qquad (4)$$

Since the prediction error is correctly received, the channel induced distortion depends on the difference in the predicted values. Using the above relations, one can derive mathematically the average channel distortion for all received. P-MBs as follows:

$$D_{PR,n} = E\{(f_{p,p,e}^i - f_{p,p,d}^i)^2\} = E\left\{\left(\sum_l a_l e_{n-1}^{j_1(i)}\right)^2\right\} = a D_{c,n-1} \qquad (5)$$

with $$a = E\left\{\sum_{l=1}^{L_{p,p}} a_l^2 + \rho \sum_{l,r,l\neq r} a_l a_r\right\} \qquad (6)$$

where $a_l$ are interpolation filter coefficients used for motion-compensated temporal prediction, which depends on the actual motion vectors used, and ρ is the average correlation coefficient between the channel-induced errors in two adjacent pixels, and $E\{.\}$ represents an averaging operation that averages the values inside $\{.\}$ for all pixels and all P-frames for the typical video sequences in a particular video category, and for the range of loss patterns under consideration.

In arriving at the above result, it is presumed that the correlation coefficients between errors in every two neighboring pixels are the same, represented by ρ. ρ can be considered as the average correlation coefficient. The parameter a is the average value of the factor $$\sum_{l=1}^{L_{p,p}} a_l^2 + \rho \sum_{l,r,l\neq r} a_l a_r$$

used over all P-MBs in all P-frames.

If an MB is lost, regardless of its coding mode, the MB will be concealed using temporal concealment with an estimated MV. Generally, the estimated MV may also be a non-integer vector, and the concealed value can be denoted by the following:

$$f_{ECP}^i = \sum_{l=1}^{L_{c,p}} h_l \tilde{f}_{n-1}^{k_l(i)} \qquad (7)$$

with $L_{c,p}$ and $k_l(i)$ differ from $L_{p,p}$ and $j_l(i)$ in general. The coefficients $h_l$ satisfy $$\sum_l h_l = 1.$$

The average channel distortion is:

$$D_{L,n} = E\{(\hat{f}_n^i - f_{ECP}^i)^2\} = D_{ECP,n} + hD_{c,n-1} \qquad (8)$$

with $$D_{ECP,n} = E\left\{\left(\hat{f}_n^i - \sum_{l=1}^{L_{c,p}} h_l \hat{f}_{n-1}^{k_l(i)}\right)^2\right\} \qquad (9)$$

$$h = E\left\{\sum_{l=1}^{L_{p,p}} h_l^2 + \rho \sum_{l,r,l\neq r} h_l h_r\right\} \qquad (10)$$

The term $D_{ECP,n}$ represents the average distortion associated with a particular temporal concealment algorithm, in the absence of error propagation from previous frames. In deriving the above result, it is presumed that the concealment error at frame n is uncorrelated with the channel-induced errors in frame n−1. As before, it is also presumed that the channel-induced errors in neighboring pixels in frame n−1 have the same pair wise correlation coefficient ρ.

Substituting Equations (5), (8) and $D_{IR,n}=0$ into Equation (2) yields the following:

$$D_{c,n} = PD_{ECP,n} + (a(1-P)(1-\beta_n) + Ph)D_{c,n-1} \qquad (11)$$

Generally, ρ<1 so that a<1 and h<1. Therefore, the spatial filtering incurred for fractional-pel motion-compensated prediction and concealment has the effect of attenuating the temporal error propagation.

The distortion model relating to the conventional frame-level recursion formula has the same form as in Equation (11) herein, but with h=1, because it assumes frame-copy for concealment. The significance and novelty of allowing h to vary will be described herein below. Also, with respect to the conventional frame-level recursion formula, the constant b is used in place of a, which has a different physical meaning than that defined with respect to the present invention. Regarding the conventional frame-level recursion formula, it is assumed that motion-compensated temporal prediction uses a single pixel in a previous frame, so that the index $L_{p,p}=1$ and $j_l(i)$ can point to a non-integer pixel. It is presumed that $$D_{PR,n} = E\left\{\left(\hat{f}_{n-1}^{j_l(i)} - \tilde{f}_{n-1}^{j_l(i)}\right)^2\right\} = bD_{c,n-1},$$

where b is used to account for the so-called motion randomness. In accordance with the principles of the present invention, the terms take on a rigorous, novel, and meaningful-distinction, with a explicitly related to the interpolation coefficients used for motion compensation using non-integer motion vectors which is not contemplated or suggested in the prior art, particularly the prior art relating to the conventional frame-level recursion formula. Additionally, the model proposed with respect to the conventional frame-level recursion formula also assumes that the concealment distortion is proportional to the frame difference square, $$D_{ECP,n} = eE\left\{(f_n^l - f_{n-1}^i)^2\right\}.$$

This assumption is only valid for the copy-from-previous-frame error-concealment method. It is to be noted that $D_{ECP,n}$ can be measured at the encoder, by running the same error concealment method on selected sample MBs as the decoder.

A description will now be given regarding a second illustrative case to which the principles of the present invention may be applied. The second case involves using intra-prediction.

With intra-prediction, the distortion associated with received P-MBs and concealed MBs using temporal concealment stay the same as in the first case described above. However, for received I-MBs, the distortion is no longer zero because an I-MB may be predicted (directly or indirectly) from neighboring pixels that are coded in the inter mode. To analyze this second case, it is presumed that a pixel $f_n^i$ is predicted by the weighted sum of several previously coded neighboring pixels in frame n, denoted by $$f_{p,i,e}^i = \sum_{l=1}^{L_{p,i}} c_l \hat{f}_n^{m_l(i)} \tag{12}$$

where $m_l(i)$ refers to the spatial index of the l-th previously coded pixel in frame n that was used to predict $f_n^i$. For example, in the H.264 standard, there are many different modes of intra-prediction, with each leading to a different set of values for $L_{p,i}$, $m_l(i)$, and $c_l$. In each case, the coefficients $c_l$ satisfy $$\sum_l c_l = 1.$$

With the constrained-intra-prediction option in the H.264 standard, only pixels previously coded in the intra-mode are allowed for intra-prediction.

If an I-MB is received, the intra-predicted value at the decoder is $$f_{p,i,d}^i = \sum_{l=1}^{L_{p,i}} c_l \tilde{f}_n^{m_l(i)} \tag{13}$$

where $\tilde{f}_n^{m_l(i)} \neq \hat{f}_n^{m_l(i)}$, in general. Note that all the neighboring pixels used for intra-prediction are also received. Denoting the average distortion of received MBs (in either inter or intra mode) by $D_{R,n}$, then the following applies:

$$D_{IR,n} = E\{(f_{p,i,e}^i - f_{p,i,d}^i)^2\} = E\left\{\left(\sum_l c_l e_n^{m_l(i)}\right)^2\right\} = c_P D_{PR,n} + c_I D_{IR,n} \tag{14}$$

or $$D_{IR,n} = \frac{c_P}{1-c_I} D_{PR,n} = cD_{c,n-1} \tag{15}$$

with $$c_P = E\left\{\sum_{l:P-neighbors} c_l^2 + \rho \sum_{l,r:P-neighbors, l \neq r} c_l c_r\right\}, \tag{16}$$

$$c_I = E\left\{\sum_{l:I-neighbors} c_l^2 + \rho \sum_{l,r:I-neighbors, l \neq r} c_l c_r\right\}, \tag{17}$$

$$c = \frac{c_P}{1-c_I} a \tag{18}$$

Substituting Equations (15), (5), and (8) into Equation (2), the recursion model for this second case is obtained as follows:

$$D_{c,n} = PD_{ECP,n} + ((1-P)(a(1-\beta_n) + c\beta_n) + Ph)D_{c,n-1} \tag{19}$$

Compared to Equation (11), it can be seen that with intra-prediction, received I-MBs do not stop error propagation any more. The error propagation factor associated with the I-MBs is c, which can be larger or smaller than a, depending on the relative magnitude of $c_P$ vs. $c_I$. Consequently, intra-prediction reduces the effectiveness of the intra-mode for stopping error propagation.

The proceeding analysis presumed unconstrained intra-prediction. With constrained intra-prediction in H.264, only intra-coded neighboring pixels in the same slice can be used for intra-prediction. Therefore $c_P=0$ and consequently c=0. The overall distortion stays the same as in the first case described by Equation (11).

A description will now be given regarding a third illustrative case to which the principles of the present invention may be applied. The third case involves using deblocking filtering and intra-prediction.

Mathematically, the deblocking operation can be described so as to modify the coded value of a pixel $\check{f}_n^i$ as follows:

$$\check{f}_n^i = \sum_{l=1}^{L_d} w_l f_n^{q_l(i)} \tag{20}$$

where $\check{f}_n^i$ represents the reconstructed value for pixel $f_n^i$ before filtering, and $\hat{f}_n^i$ the reconstructed value after filtering. The index $q_l(i)$ represents the l-th neighboring pixel used for filtering pixel i. The filtering length $L_d$ and the filter coefficients $w_l$ are typically location and content dependent, with coefficients satisfy $$\sum_l w_l = 1.$$

In the decoder, if a MB is received, then the same filtering is applied to the reconstructed values $\tilde{f}_n^i$ after a MB is decoded, with the filtered value as follows:

$$\tilde{f}_n^l = \sum_{l=1}^{L_d} w_l \bar{f}_n^{q_l(i)} \tag{21}$$

For a received P-MB, the distortion is due to the difference between the predicted values after deblocking filtering, i.e., $$D_{PR,n} = \tag{22}$$
$$E\left\{\left(\sum_l w_l (f_{p,p,e}^{q_l(i)} - f_{p,p,d}^{q_l(i)})\right)^2\right\} = wE\{(f_{p,p,e}^i - f_{p,p,d}^i)^2\} = a' D_{c,n-1}$$

$$\text{with } w = E\left\{\sum_{l=1}^{L_{pi}} w_l^2 + \rho \sum_{l,r,l\neq r} w_l w_r\right\}; a' = wa \tag{23}$$

For a received I-MB, following the same reasoning, $$D_{IR,n} = E\left\{\left(\sum_l w_l (f_{p,i,e}^{q_l(i)} - f_{p,i,d}^{q_l(i)})\right)^2\right\} = c' D_{c,n-1} \tag{24}$$

with $$c' = wc \tag{25}$$

For a lost MB, if deblocking is NOT applied after concealment, then its distortion stays as in Equation (8), so that the average distortion is $$D_{c,n} = PD_{ECP,n} + ((1-P)(a'(1-\beta_n) + c'\beta_n) + hP)D_{c,n-1} \tag{26}$$

with $$a' = wa, c' = wc. \tag{27}$$

If deblocking is applied after concealment, then $D_{L,n} = D_{ECP,n} + whD_{c,n-1}$, so that $$D_{c,n} = PD_{ECP,n} + ((1-P)(a'(1-\beta_n) + c'\beta_n) + h'P)D_{c,n-1} \tag{28}$$

with $$h' = wh. \tag{29}$$

The recursion Equations (26) and (28) have the same form as that for the second case, Equation (19). Therefore, Equation (19) can be used to describe all these cases, but with the constants a, c, and h having slightly different physical meanings.

A description will now be given regarding a simplified model in accordance with the principles of the present invention.

The recursion models in Equations (11) and (19) presume that one can measure $\beta_n$ and $D_{ECP,n}$ for each frame. In a simplified version, only the average concealment distortion over frames $D_{ECP}$ and the average intra rate $\beta$ is required, with Equations (11) and (19) changed to the following, respectively:

First case: $D_{c,n} = PD_{ECP} + (a(1-P)(1-\beta) + Ph)D_{c,n-1}$ (30)

Second and Third cases: $D_{c,n} = PD_{ECP} + ((1-\beta)(a(1-\beta) + c\beta) + hP)D_{c,n-1}$ (31)

A description will now be given regarding distortion calculation based on the recursive equations provided herein.

Figure 2:
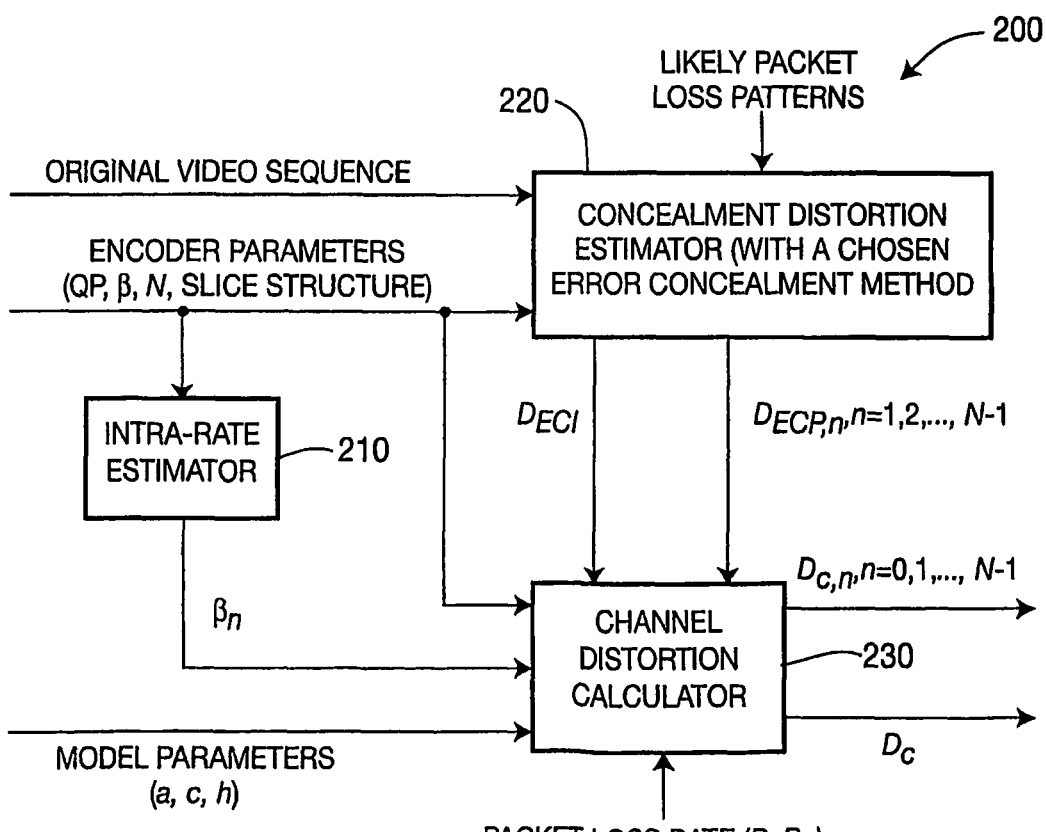
FIG. 2 shows a block diagram of an apparatus for calculating channel-induced distortion in accordance with the principles of the present invention.

Turning to FIG. 2, an apparatus for calculating channel induced distortion is indicated generally by the reference numeral 200.

The apparatus 200 includes an intra-rate estimator 210, a concealment distortion estimator 220, and a channel distortion calculator 230. First and second outputs of the concealment distortion estimator 220 are respectively connected in signal communication with first and second inputs of the channel distortion calculator 230. A first output of the intra-rate estimator 210 is connected in signal communication with a third input of the channel distortion calculator 230. The intra-rate estimator 210, the concealment distortion estimator 220, and the channel distortion calculator 230 respectively include a first input, a third input, and a third input for receiving encoder parameters (QP, β, N, and slice structure). The concealment distortion estimator 220 also includes a fourth input for receiving the original video sequence and a fifth input for receiving packet loss patterns. The channel distortion calculator 230 also includes a fourth input for receiving model parameters (a, c, h), and a fifth input for receiving packet loss rate (P, $P_l$). The channel distortion calculator 230 also includes first and second outputs for respectfully outputting $D_{c,n}$ and $D_c$.

The apparatus 200 may be used to calculate the distortion $D_{c,n}$ using the recursion equations provided herein, assuming the model parameters are given. The method for the first case above will now be described. This presumes a video encoder that employs motion-compensated temporal prediction and concealment, and possibly constrained intra-prediction. However, it does not employ unconstrained intra-prediction and in-loop deblocking filtering. FIG. 2 presumes that a video is divided into groups of frames (GoFs), and each GoF is coded independently, with the first frame coded as an I-frame, and the following N−1 frames coded as P-frames, where N is a chosen number.

Given encoding parameters in terms of QP, target intra-rate β, and slice structure, for each GoF of a given video sequence, the concealment distortion estimator 220 determines the expected concealment distortion $D_{ECP,n}$ in the absence of error propagation. This will be done as follows: run the video encoder using the specified encoding parameters to generate a decoded sequence without transmission errors. Then for frame n, randomly set one slice to be lost according to the specified likely loss patterns (bursty vs. randomly distributed), and apply the chosen error concealment algorithm on all MBs in this slice, while assuming all other slices are correctly received. The average channel distortion is determined for MBs in this slice. The determination is repeated for other randomly chosen slices in this frame. In the extreme case, one can repeat this process for all slices in the frame. Averaging the resulting distortion will yield $D_{ECP,n}$. It is to be noted that in the most common case where all MBs in a frame are contained in one slice, the concealment experiment can be run only once per frame, which can be done as part of the video encoder. Using a similar procedure, the concealment distortion estimator 220 also estimates the average concealment distortion for MBs in the I-frame, denoted by $D_{ECI}$. In this case, only spatial error concealment is used for lost slices.

The intra-rate estimator 220 simply records the actual intra rate per frame $\beta_n$ and computes the average intra rate $\beta$ for the given target intra rate $\beta$.

With the measured $D_{ECI}$, $D_{ECP,n}$, and $\beta_n$, the given model parameters a and h, and the given expected packet loss rate for the I-frames and P-frames, $P_I$ and P, the channel distortion calculator 230 determines the channel-distortion for each frame $D_{c,n}$ by applying Equation (11) recursively, starting with n=1, by assuming $D_{c,0}=P_I D_{ECI}$ for the I-frame. Once the distortion for all frames is determined, the channel distortion calculator 230 can also determine the average channel distortion over this GoF, using the following:

$$D_c = \frac{1}{N} \sum_{n=0}^{N-1} D_{c,n} \qquad (32)$$

If the encoder uses unconstrained intra-prediction with or without deblocking filtering, then the channel distortion calculator 230 will require model parameters a, c and h, and uses Equation (19) for calculating $D_{c,n}$ recursively.

FIG. 2 presumes periodic I-frames are invoked after every N frames. In video telephony and teleconferencing applications, periodic I-frames are not used to satisfy the low-delay constraint. In that case, only the first frame of a video is coded as an I-frame and all remaining frames are coded as P-frames, with enforced intra-MBs in each P-frame. In this case, it can be presumed that the first I-frame will be delivered error free through protection at the transport level. Then, the distortion for this frame is zero, i.e., $D_{c,0}=0$. The distortion for all of the following frames can be estimated using our recursion models (11) or (19) depending on encoder and decoder configuration.

In a simplified version, the concealment distortion estimator 220 will not estimate $D_{ECP,n}$ rather the average value $D_{ECP}$ over each GoF. This may be done by randomly setting some slices in the GoF to be lost, performing error concealment on these slices, calculating their concealment distortions, and taking the average. Alternatively, one may estimate the average $D_{ECP}$ for each GoF based on some statistics calculated from the original or encoded sequence. Similarly, the intra-rate estimator 210 may not determine the actual intra-rate for each frame $\beta_n$ by running the video encoder over the entire GoF. The intra-rate estimator 210 may instead determine the average intra rate $\beta$ for the given target intra-rate $\beta$ based on some statistics calculated from the original sequence. Given $D_{ECP}$ and $\beta$, the channel distortion calculator 230 will use the simplified models (30) or (31) and (32) to determine $D_{c,n}$ and $D_c$.

A description will now be given regarding the estimation of model parameters.

The models derived for the different cases described above have parameters that must be estimated. Initially, the method for estimating the parameters a and h for the first case will be described.

Figure 3:
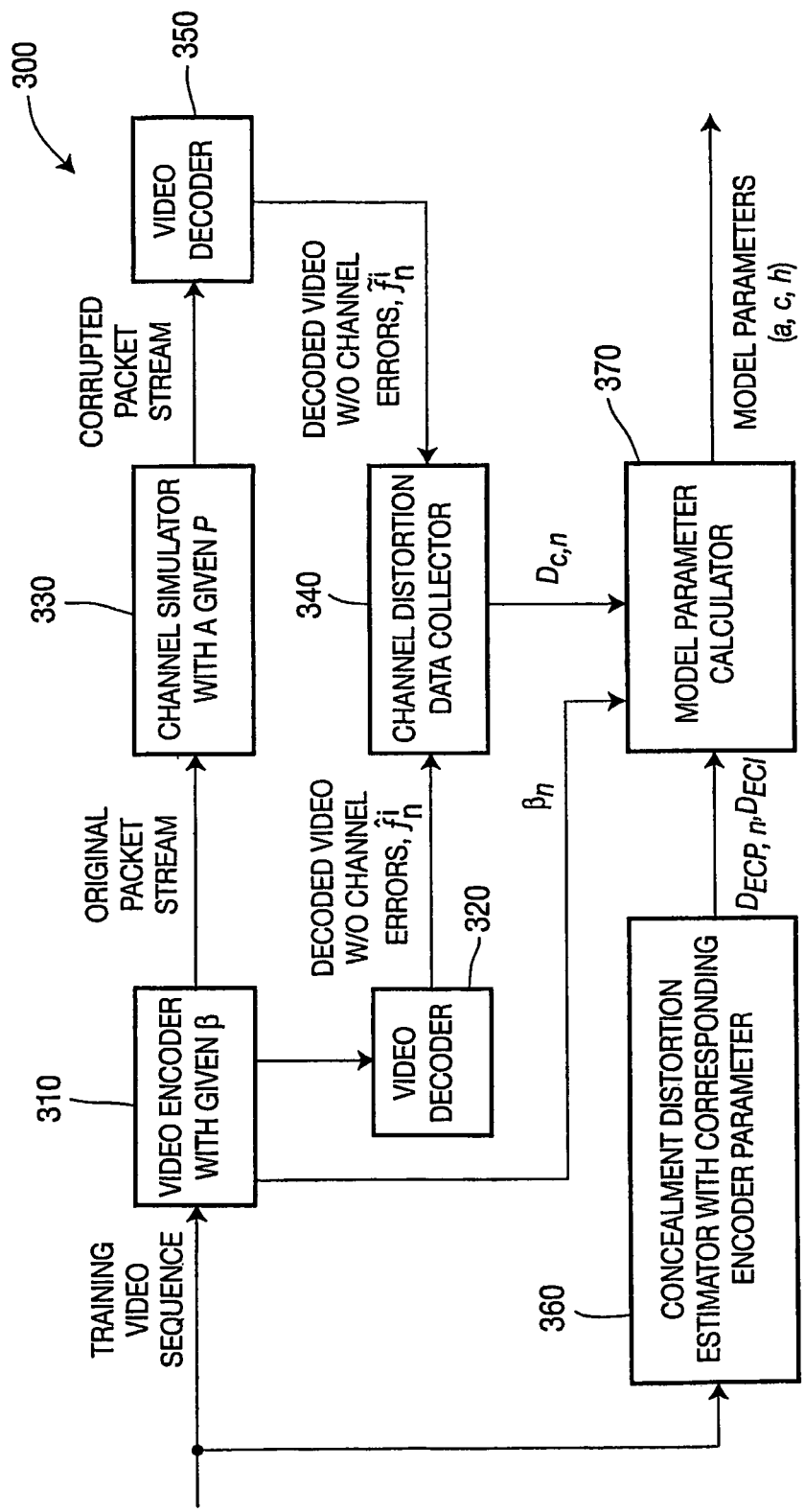
FIG. 3 shows a block diagram of an apparatus for estimating the parameters in a channel distortion model in accordance with the principles of the present invention.

Turning to FIG. 3, an apparatus for channel distortion model parameter estimation is indicated generally by the reference numeral 300. The apparatus 300 includes a video encoder 310, a channel simulator 330, a video decoder 350, a' video decoder 320, a channel distortion data collector 340, a concealment distortion estimator 360, and a model parameter calculator 370. The video encoder 310 and the concealment distortion estimator 360 each include a first input for receiving training video-sequences. The video encoder 310 also includes a first output in signal communication with a first input of the channel simulator 330, and a second output in signal communication with a first input of the video decoder 320. The channel simulator 330 also includes a first output in signal communication with a first input of the video decoder 350. The video decoder 350 also includes a first output in signal communication with a first input of the channel distortion data collector 340. The channel distortion data collector 340 also includes a second input in signal communication with a first output of the video decoder 320, and a first output in signal communication with a first input of the model parameter calculator 370. The model parameter calculator 370 also includes a second input in signal communication with a third output of the video encoder 310, and a third input in signal communication with a first output of the concealment distortion estimator 360, and a first output that is available as an output of the apparatus 300.

Initially, training video sequences are collected. Here, it is presumed that different training sets will be chosen, each for a particular type of video with relatively similar characteristics in terms of motion predictability. Different parameters will be derived for different training sets. For a video chosen from a given training set, a given target intra-rate $\beta'$, a given GoF length N, a given QP, and a given slice structure, the video encoder 310 will generate a bit stream for successive GoFs. For each P-frame, the video encoder 310 will choose $\beta'$ percentage of MBs randomly and code them in the intra mode. For the remaining MBs, either inter or intra mode may be used, depending on which mode gives the lower rate. The actual intra-rate for each coded video frame $\beta_n$ will be recorded, with $\beta_n >= \beta'$.

The encoded bit stream will be converted into successive packets, using a fixed packetization method. In one possible implementation, each packet includes data from one slice. It is presumed that the packetizer is part of the video encoder 310. From the original packet stream, the video decoder 320 will first convert it to a depacketized bit stream, from which to generate the decoded frames without channel errors, $\hat{f}_n^i$. It is presumed that the depacketizer is part of the video decoder 320.

For a given packet loss rate P, the channel simulator 330 will corrupt the packetized stream so that on average P percentage of packets will be dropped randomly. The video decoder 350 will depacketize the corrupted packet stream and generate the decoded video frames $\tilde{f}_n^i$ from the corrupted bit stream, by employing a chosen error concealment method that implements temporal error concealment with or without motion compensation. By comparing the decoded frames from video decoder 320 and video decoder 350, the channel distortion data collector 340 computes the average channel distortion in each frame for each particular channel simulation using equation (1). By running the channel simulator 330 and the decoder 350 many times, and averaging the measured channel distortions for the same frame n, the channel distortion data collector 340 determines $D_{c,n}$, n=1, 2, ..., N−1.

For the given sequence and the encoding parameters, the concealment distortion estimator 360 computes the concealment distortion $D_{ECI}$ and $D_{ECP,n}$. The operation of the concealment distortion estimator 360 is further described herein above.

With the collected data for $D_{c,n}$, $D_{ECI}$, $D_{ECP,n}$, and $\beta_n$, the model parameter; calculator 370 uses the least square fitting method to obtain the parameters a and h to fit the recursion Equation (11). Specifically, $$\{a, h\} = \underset{a,h}{\operatorname{argmin}} \left\{ \sum_{n=2}^{N-1} (D_{c,n} - PD_{ECP,n} - (a(1-P)(1-\beta_n) + Ph)D_{c,n-1})^2 \right\} \quad (33)$$

or $$x = (A^T A)^{-1} A^T y \quad (34)$$

with $$x = \begin{bmatrix} a \\ h \end{bmatrix}, \quad y = \begin{bmatrix} D_{c,2} - PD_{ECP,2} \\ D_{c,3} - PD_{ECP,3} \\ \vdots \\ D_{c,N-1} - PD_{ECP,N-1} \end{bmatrix}, \quad (35)$$

$$A = \begin{bmatrix} (1-P)(1-\beta_2)D_{c,1} & PD_{c,1} \\ (1-P)(1-\beta_3)D_{c,2} & PD_{c,2} \\ \cdots & \cdots \\ (1-P)(1-\beta_{N-1})D_{c,N-2} & PD_{c,N-2} \end{bmatrix}$$

For the second case and the third case described above, the model parameter calculator 370 determines a, c, and h to fit the recursion Equation (19). Specifically, $$\{a, c, h\} = \underset{a,c,h}{\operatorname{argmin}} \quad (36)$$

$$\left\{ \sum_{n=2}^{N-1} (D_{c,n} - PD_{ECP,n} - ((1-P)(a(1-\beta_n) + c\beta_n) + Ph)D_{c,n-1})^2 \right\}$$

or $$x = (A^T A)^{-1} A^T y \quad (37)$$

with $$x = \begin{bmatrix} a \\ c \\ h \end{bmatrix}, \quad y = \begin{bmatrix} D_{c,2} - PD_{ECP,2} \\ D_{c,3} - PD_{ECP,3} \\ \vdots \\ D_{c,N-1} - PD_{ECP,N-1} \end{bmatrix}, \quad (38)$$

$$A = \begin{bmatrix} (1-P)(1-\beta_2)D_{c,1} & (1-P)\beta_2 D_{c,1} & PD_{c,1} \\ (1-P)(1-\beta_3)D_{c,2} & (1-P)\beta_3 D_{c,2} & PD_{c,2} \\ \vdots & \vdots & \vdots \\ (1-P)(1-\beta_{N-1})D_{c,N-2} & (1-P)\beta_{N-1}D_{c,N-2} & PD_{c,N-2} \end{bmatrix}$$

Note with the simplified model, represented by Equation (30) or (31), the terms $D_{ECP,n}$ and $\beta_n$ will be replaced by $D_{ECP}$ and $\beta$, respectively.

The above method derives parameters for a given loss rate and the average intra-rate that is determined from the encoded data (slightly higher than the preset target intra-rate) for a given GoF in a given video.

To obtain parameters for a large range of P and $\beta$, one can first obtain parameter sets for a few pairs of P and $\beta$ using the above procedures. From the resulting parameters, one can perform interpolation to obtain the parameters for other values of P and $\beta$. Alternatively, one can also use the average of the parameters derived from different P and $\beta$. Alternatively, one can incorporate training data for different P and $\beta$ in the vectors y and A, to determine the parameters.

The preceding methods generate model parameters for a given video sequence for either a specified pair of P and $\beta$ or for a specified range of P and $\beta$. To obtain parameters for a certain video category that has similar motion characteristics, one can repeat the aforementioned data collection process for several selected video sequences in a given video category, and determine the parameters using (36) or (38) by including measured data for different sequences and different pairs of P and $\beta$ in y and A.

Figure 4:
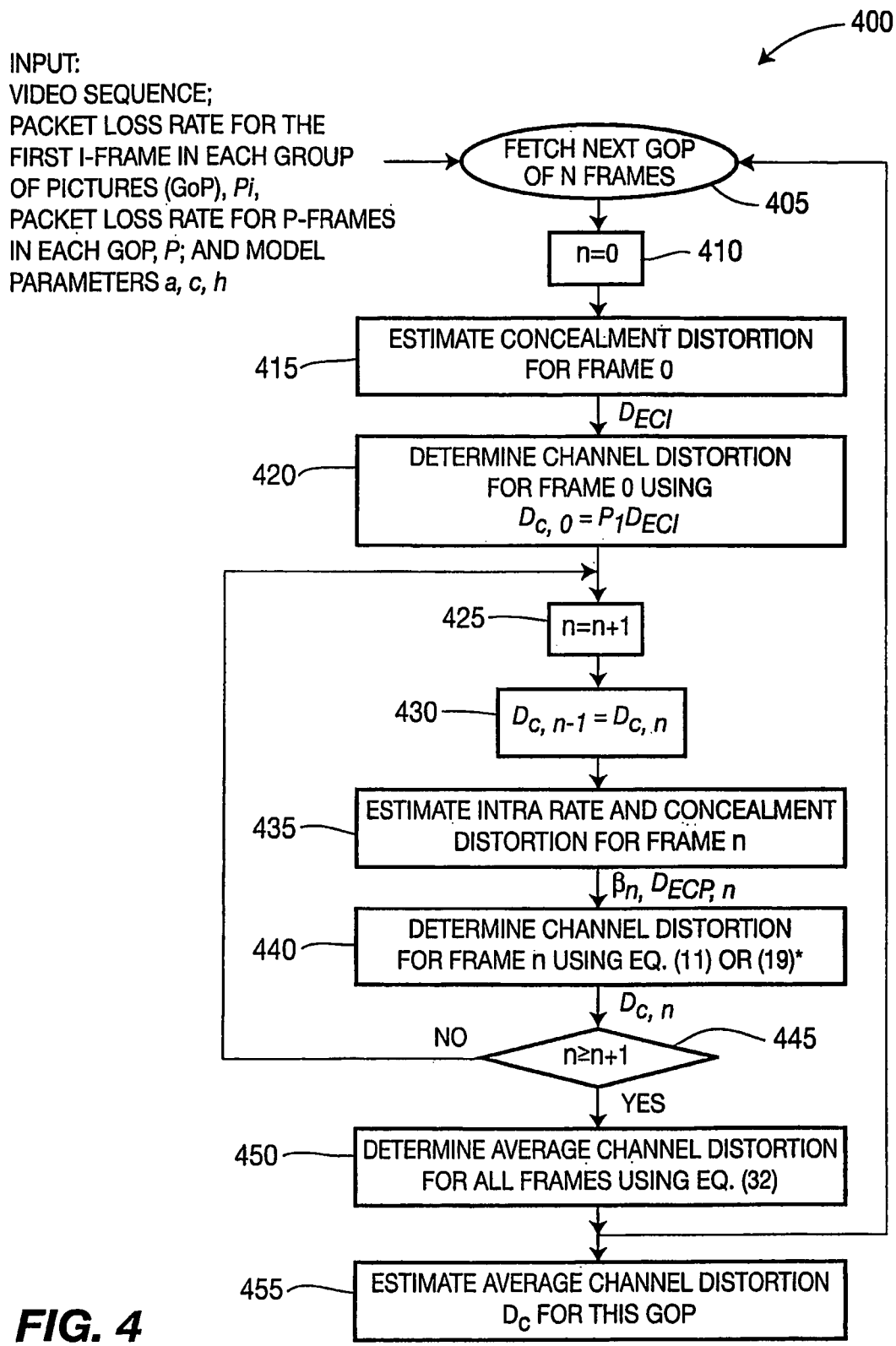
FIG. 4 shows a flow diagram of a method for estimating channel distortion based on intra rate and concealment distortion for each frame in accordance with the principles of the present invention.

Turning to FIG. 4, a method for estimating channel distortion based on intra rate and concealment distortion for each frame is indicated generally by the reference numeral 400.

An input block 405 receives an input video sequence, packet loss rate for the first I-frame in each GOP in the video sequence (PI), packet loss rate for P-frames in each GOP in the video sequence (P), model parameters a, c, and h, fetches a next GOP of N frames from the video sequence, and passes control to a function block 410. The function block 410 sets n=0, and passes control to a function block 415. The function block 415 estimates the concealment distortion for frame 0, and passes control to a function block 420. The function block 420 determines the channel distortion for frame 0 using $D_{c,0}=P_I D_{ECI}$, and passes control to a function block 425. The function block 425 increments n by 1 (n=n+1), and passes control to a function block 430. The function block 430 sets $D_{c,n-1}=D_{c,n}$, and passes control to a function block 435. The function block 435 estimates the intra rate and concealment distortion for frame n, and passes control to a function block 440. The function block 440 determines the channel distortion for frame n using Equation 11 or Equation 19. Equation 11 is used if the encoder in which the method 400 is employed does not use intra prediction or uses only constrained intra prediction. Equation 19 is used if the encoder in which the method 400 is employed uses non-constrained intra prediction. The function block 440 then passes control to a decision block 445. The decision block 445 determines whether or not n>=N-1. If n<N-1, then control is returned to function block 425. Otherwise, if n >=N-1, then control is passed to a function block 450. The function block 450 determines the average channel distortion for all frames using Equation 32, and passes control to an output block 455 and also returns to function block 405 to fetch the next GOP of N frames. The output block 455 outputs the estimated average channel distortion $D_c$ for the GOP.

Figure 5:
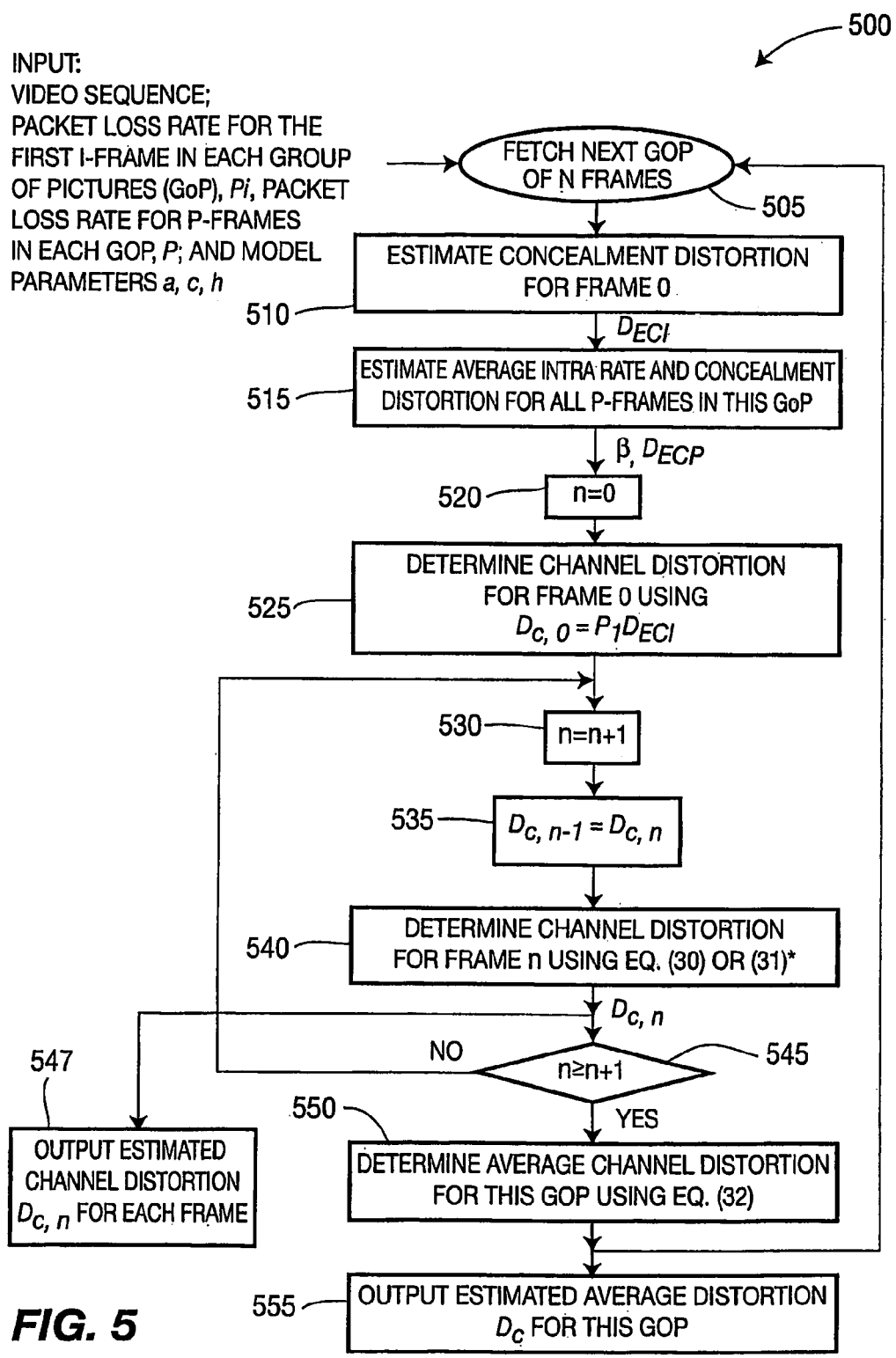
FIG. 5 shows a flow diagram of a method for estimating channel distortion based on the average intra rate and concealment distortion in each group of pictures in a video sequence in accordance with the principles of the present invention.

Turning to FIG. 5, a method for estimating channel distortion based on the average intra rate and concealment distortion in each group of pictures in a video sequence is indicated generally by the reference numeral 500.

An input block 505 receives an input video sequence, packet loss rate for the first I-frame in each GOP in the video sequence (PI), packet loss rate for P-frames in each GOP in the video sequence (P), model parameters a, c, and h, fetches a next GOP of N frames from the video sequence, and passes control to a function block 510. The function block 510 estimates the concealment distortion for frame 0, and passes control to a function block 515. The function block 515 estimates the average intra rate and concealment distortion for all P-frames in the GOP, and passes control to a function-block 520. The function block 520 sets n=0, and passes control to a function block 525. The function block 525 determines the channel distortion for frame 0 using $D_{c,0}=P_I D_{ECI}$, and passes control to a function block 530. The function block 530 increments n by 1 (n=n+1), and passes control to a function block 535. The function block 535 sets $D_{c,n-1}=D_{c,n}$, and passes control to a function block 540. The function block 540 determines the channel distortion for frame n using Equation 30 or Equation 31. Equation 30 is used if the encoder in which the method 500 is employed does not use intra prediction or uses only constrained intra prediction. Equation 31 is used if the encoder in which the method 500 is employed uses non-constrained intra prediction. The function block 540 then passes control to a function block 547 and a decision block 545. The function block 547 outputs the estimated channel distortion $D_{c,n}$ for each frame.

The decision block 545 determines whether or not n>=N−1. If n<N−1, then control is returned to function block 525. Otherwise, if n>=N−1, then control is passed to a function block 550. The function block 550 determines the average channel distortion for the GOP using Equation 32, and passes control to an output block 555 and also returns to function block 505 to fetch the next GOP of N frames. The output block 555 outputs the estimated average channel distortion $D_c$ for the GOP.

Figure 6:
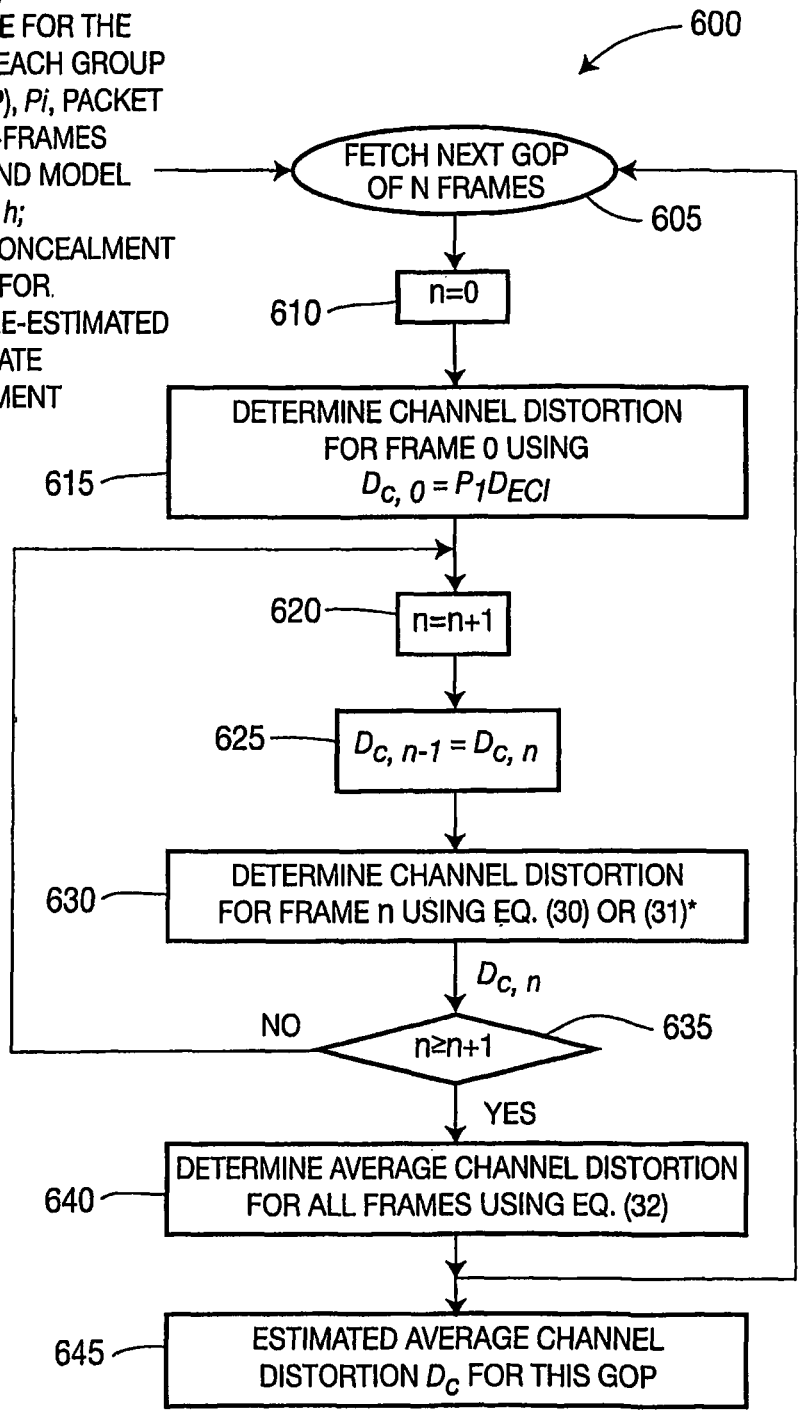
FIG. 6 shows a flow diagram of a method for estimating channel distortion based on pre-estimated concealment distortion for I-frames and average intra rate and concealment distortion for P-frames for a video sequence in accordance with the principles of the present invention.

Turning to FIG. 6, a method for estimating channel distortion based on pre-estimated concealment distortion for I-frames and average intra rate and concealment distortion for P-frames for a video sequence is indicated generally by the reference numeral 600.

An input block 605 receives an input video sequence, packet loss rate for the first I-frame in each GOP in the video sequence (PI), packet loss rate for P-frames in each GOP in the video sequence (P), model parameters a, c, and h, fetches a next GOP of N frames from the video sequence, and passes control to a function block 610. The function block 610 sets n=0, and passes control to a function block 615. The function block 615 determines the channel distortion for frame 0 using $D_{c,0}=P_I D_{ECI}$, and passes control to a function block 620. The function block 620 increments n by 1 (n=n+1), and passes control to a function block 625. The function block 625 sets $D_{c,n-1}=D_{c,n}$, and passes control to a function block 630. The function block 630 determines the channel distortion for frame n using Equation 30 or Equation 31. Equation 30 is used if the encoder in which the method 600 is employed does not use intra prediction or uses only constrained intra prediction. Equation 31 is used if the encoder in which the method 600 is employed uses non-constrained intra prediction. The function block 630 then passes control to a decision block 635. The decision block 635 determines whether or not n>=N−1. If n<N−1, then control is returned to function block 620. Otherwise, if n>=N−1, then control is passed to a function block 640. The function, block 640 determines the average channel distortion for all frames using Equation 32, and passes control to an output block 655 and also returns to function block 605 to fetch the next GOP of N frames. The output block 655 outputs the estimated average channel distortion $D_c$ for the GOP.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A method in a distortion calculator computer for estimating distortion for an inter-coded image, comprising:
   accessing with the distortion calculator computer an average channel distortion estimated for a previously coded image; and
   calculating with the distortion calculator computer an average channel distortion for the inter-coded image as said average channel distortion estimated for the previously coded image scaled by a scaling factor (1−P)(a(1−β)+β)+hP, where P represents a packet loss rate, β represents an intra rate, a is a parameter associated with inter-prediction, c is a parameter associated with intra-prediction, and h is a parameter associated with concealment, where:
   the inter-coded image is encoded with inter-prediction and temporal concealment with non-integer motion vectors, and without intra-prediction and deblocking filtering,
   the inter-coded image is encoded with inter-prediction and temporal concealment with non-integer motion vectors, with intra-prediction, and without deblocking filtering, or
   the inter-coded image is encoded with inter-prediction and temporal concealment with non-integer motion vectors, and with intra-prediction and deblocking filtering.

2. The method according to claim 1, wherein the parameter c is set to zero when the inter-coded image is encoded without intra-prediction or encoded with constrained intra-prediction.

3. The method according to claim 1, wherein the parameter a is calculated as follows $$a = wE\left\{\sum_{l=1}^{L_{p,p}} a_l^2 + \rho \sum_{l,r,l\neq r} a_l a_r\right\},$$

wherein $a_l$ and $a_r$ represent interpolation filter coefficients used for motion-compensated temporal prediction, $L_{p,p}$ represents a number of neighboring samples used for interpolation, ρ represents an average correlation coefficient between channel-induced errors in two adjacent pixels, and E{.} represents an averaging operation that averages values inside {.} for inter-coded pixels, and wherein when the inter-coded image is encoded without deblocking filtering w is set to one, and when the inter-coded image is encoded with deblocking filtering w is determined as follows $$w = E\left\{\sum_{l=1}^{L_d} w_l^2 + \rho \sum_{l,r,l \neq r} w_l w_r\right\}$$

wherein $w_l$ and $w_r$ represent deblocking filter coefficients, and $L_d$ represents a number of neighboring samples used for the deblocking filtering.

4. The method according to claim 1, wherein the parameter c is calculated as follows $$c = \frac{c_P}{1 - c_I} a,$$

wherein $C_P$ and $c_I$ are respectively determined as follows $$c_P = E\left\{\sum_{l:P-neighbors} c_l^2 + \rho \sum_{l,r:P-neighbors,l \neq r} c_l c_r\right\},$$

$$c_I = E\left\{\sum_{l:I-neighbors} c_l^2 + \rho \sum_{l,r:I-neighbors,l \neq r} c_l c_r\right\}$$

wherein $c_l$ and $c_r$ represent weighting coefficients used for intra-prediction, I-neighbors represents a set of all neighboring samples used for the intra-prediction that were previously coded using intra-mode, and P-neighbors represents a set of all neighboring samples used for the intra-prediction that were previously coded using inter-mode, and E{.} represents an averaging operation that averages values inside {.} for intra-coded pixels in P-frames.

5. The method according to claim 1, wherein the parameter h is calculated as follows $$h = wE\left\{\sum_{l=1}^{L_{p,p}} h_l^2 + \rho \sum_{l,r,l \neq r} h_l h_r\right\},$$

wherein $h_l$ and $h_r$ represent interpolation filter coefficients used for motion-compensated temporal error concealment $L_{p,p}$ represents a number of neighboring samples used for interpolation, ρ represents an average correlation coefficient between channel-induced errors in two adjacent pixels, and E{.} represents an averaging operation that averages values inside {.} for concealed pixels, and wherein when deblocking filtering is not applied after motion-compensated temporal error concealment w is set to one, and when deblocking filtering is applied after motion-compensated temporal error concealment w is calculated as follows:

$$w = E\left\{\sum_{l=1}^{L_d} w_l^2 + \rho \sum_{l,r,l \neq r} w_l w_r\right\};$$

wherein $w_l$ and $w_r$ are deblocking filter coefficients, and $L_d$ represents a number of neighboring samples used for the deblocking filtering.

6. The method according to claim 1, further comprising determining an error concealment distortion for the inter-coded image, including:

defining a concealment distortion for a given macroblock in the inter-coded image as a channel distortion for the given macroblock when there is an absence of transmission losses in other frames and other macroblocks in the inter-coded image;

estimating the concealment distortion for a selected macroblock in the inter-coded image by setting the selected macroblock as lost and concealing the selected macroblock using a decoder error concealment;

repeating said estimating step for other selected macroblocks in the inter-coded image, and calculating the error concealment distortion based upon the estimated concealment distortions for the selected macroblocks in the inter-coded image.

7. An apparatus for estimating distortion for an inter-coded image, comprising:

a distortion calculator computer for accessing an average channel distortion estimated for a previously coded image and for calculating an average channel distortion for the inter-coded image as said average channel distortion estimated for the previously coded image scaled by a scaling factor $(1-P)(a(1-\beta)+c\beta)+hP$, where P represents a packet loss rate, β represents an intra rate, a is a parameter associated with inter-prediction, c is a parameter associated with intra-prediction, and h is a parameter associated with concealment, where:

the inter-coded image is encoded with inter-prediction and temporal concealment with non-integer motion vectors, and without intra-prediction and deblocking filtering, the inter-coded image is encoded with inter-prediction and temporal concealment with non-integer motion vectors, with intra-prediction, and without deblocking filtering, or the inter-coded image is encoded with inter-prediction and temporal concealment with non-integer motion vectors, and with intra-prediction and deblocking filtering.

8. The apparatus according to claim 7, wherein said distortion calculator computer sets the parameter c to zero when the inter-coded image is encoded without intra-prediction or encoded with constrained intra-prediction.

9. The apparatus according to claim 7, wherein said distortion calculator computer calculates the parameter a as follows $$a = wE\left\{\sum_{l=1}^{L_{p,p}} a_l^2 + \rho \sum_{l,r,l \neq r} a_l a_r\right\},$$

wherein $a_l$ and $a_r$ represent interpolation filter coefficients used for motion-compensated temporal prediction, $L_{p,p}$ represents a number of neighboring samples used for interpolation, ρ represents an average correlation coefficient between channel-induced errors in two adjacent pixels, and $E\{.\}$ represents an averaging operation that averages values inside $\{.\}$ for inter-coded pixels, and wherein when the inter-coded image is encoded without deblocking filtering w is set to one, and when the inter-coded image is encoded with deblocking filtering w is determined as follows $$w = E\left\{\sum_{l=1}^{L_d} w_l^2 + \rho \sum_{l,r,l\neq r} w_l w_r\right\}$$

wherein $w_l$ and $w_r$ represent deblocking filter coefficients, and $L_d$ represents a number of neighboring samples used for the deblocking filtering.

10. The apparatus according to claim 7, wherein said distortion calculator computer calculates the parameter c as follows $$c = \frac{c_P}{1-c_I}a,$$

wherein $c_P$ and $c_I$ are respectively determined as follows $$c_P = E\left\{\sum_{l:P-neighbors} c_l^2 + \rho \sum_{l,r:P-neighbors,l\neq r} c_l c_r\right\},$$

$$c_I = E\left\{\sum_{l:I-neighbors} c_l^2 + \rho \sum_{l,r:I-neighbors,l\neq r} c_l c_r\right\}$$

wherein $c_l$ and $c_r$ represent weighting coefficients used for intra-prediction, I-neighbors represents a set of all neighboring samples used for the intra-prediction that were previously coded using intra-mode, and P-neighbors represents a set of all neighboring samples used for the intra-prediction that were previously coded using inter-mode, and $E\{.\}$ represents an averaging operation that averages values inside $\{.\}$ for intra-coded pixels in P-frames.

11. The apparatus according to claim 7, wherein said distortion calculator computer calculates the parameter h as follows $$h = wE\left\{\sum_{l=1}^{L_{p,p}} h_l^2 + \rho \sum_{l,r,l\neq r} h_l h_r\right\},$$

wherein $h_l$ and $h_r$ represent interpolation filter coefficients used for motion-compensated temporal error concealment, $L_{p,p}$ represents a number of neighboring samples used for interpolation, $\rho$ represents an average correlation coefficient between channel-induced errors in two adjacent pixels, and $E\{.\}$ represents an averaging operation that averages values inside $\{.\}$ for concealed pixels, and wherein when deblocking filtering is not applied after motion-compensated temporal error concealment w is set to one, and when deblocking filtering is applied after motion-compensated temporal error concealment w is calculated as follows:

$$w = E\left\{\sum_{l=1}^{L_d} w_l^2 + \rho \sum_{l,r,l\neq r} w_l w_r\right\};$$

wherein $w_l$ and $w_r$ are deblocking filter coefficients, and $L_d$ represents a number of neighboring samples used for the deblocking filtering.

12. The apparatus according to claim 7 further comprising a distortion estimator computer for
estimating a concealment distortion for a selected macroblock in the inter-coded image by setting the selected macroblock as lost and concealing the selected macroblock using a decoder error concealment,
repeating the estimating for other selected macroblocks in the inter-coded image, and
calculating an error concealment distortion based upon the estimated concealment distortions for the selected macroblocks in the inter-coded image.

* * * * *